US012621913B2

(12) United States Patent
Cheng et al.

(10) Patent No.: US 12,621,913 B2
(45) Date of Patent: May 5, 2026

(54) LED CURRENT OVERSHOOT REDUCTION APPARATUS AND METHOD

(71) Applicant: Diodes Incorporated, Plano, TX (US)

(72) Inventors: Dongjie Cheng, Murphy, TX (US); Allan Ming-Lun Lin, Pleasanton, CA (US)

(73) Assignee: Diodes Incorporated, Plano, TX (US)

( * ) Notice: Subject to any disclaimer, the term of this patent is extended or adjusted under 35 U.S.C. 154(b) by 51 days.

(21) Appl. No.: 18/789,342

(22) Filed: Jul. 30, 2024

(65) Prior Publication Data

US 2026/0040416 A1 Feb. 5, 2026

(51) Int. Cl.

| | |
|---|---|
| ***H05B 45/30*** | (2020.01) |
| ***H05B 45/325*** | (2020.01) |
| ***H05B 45/345*** | (2020.01) |
| ***H05B 45/397*** | (2020.01) |
| ***H05B 47/165*** | (2020.01) |
| ***H05B 47/25*** | (2020.01) |

(52) U.S. Cl.

CPC ......... *H05B 45/345* (2020.01); *H05B 45/325* (2020.01); *H05B 45/397* (2020.01); *H05B 47/165* (2020.01); *H05B 47/25* (2020.01)

(58) Field of Classification Search

CPC ........ H05B 45/35; H05B 45/44; H05B 45/46; H05B 45/325; H05B 45/345; H05B 45/397; H05B 45/3725; H05B 47/25; H05B 47/165

See application file for complete search history.

(56) References Cited

U.S. PATENT DOCUMENTS

| | | | | |
|---|---|---|---|---|
| 10,542,593 | B1 * | 1/2020 | Mignoli | H05B 45/54 |
| 11,849,514 | B1 * | 12/2023 | Montoncelli | H05B 45/35 |
| 12,477,631 | B2 * | 11/2025 | Hsieh | H05B 45/12 |
| 2009/0189539 | A1 * | 7/2009 | Deng | H05B 45/46 315/294 |
| 2009/0195191 | A1 * | 8/2009 | Lin | H05B 45/10 315/307 |
| 2010/0090755 | A1 | 4/2010 | Ng et al. | |

(Continued)

FOREIGN PATENT DOCUMENTS

| | | | |
|---|---|---|---|
| CN | 102740564 | A | 10/2012 |
| CN | 106304460 | A | 1/2017 |

OTHER PUBLICATIONS

International Search Report and Written Opinion for Application No. PCT/US2024/046282, mailed on Apr. 23, 2025, 7 pages.

(Continued)

*Primary Examiner* — Tung X Le

(74) *Attorney, Agent, or Firm* — AP3 Law Firm PLLC

(57) ABSTRACT

An apparatus includes a reference current generation circuit coupled between a first voltage bus and a second voltage bus, wherein the reference current generation circuit is configured to generate a predetermined reference current, a first reference current path comprising a first switch, wherein the predetermined reference current is configured to be mirrored to generate a first reference current in the first reference current path, a load current path comprising a power switch, and a pulse width modulation (PWM) deglitch circuit configured to control the first switch so as to reduce an overshoot occurring at a leading-edge of a load current flowing through the power switch.

20 Claims, 9 Drawing Sheets

(56) References Cited

U.S. PATENT DOCUMENTS

| | | | | |
|---|---|---|---|---|
| 2013/0015780 | A1 * | 1/2013 | Gao | H05B 45/397<br>315/250 |
| 2019/0380180 | A1 | 12/2019 | Miyajima et al. | |

OTHER PUBLICATIONS

Office Action received in Taiwanese Patent Application No. 114115094, dated Feb. 26, 2026.

* cited by examiner

LED CURRENT OVERSHOOT REDUCTION APPARATUS AND METHOD

TECHNICAL FIELD

The present disclosure relates generally to the field of integrated circuits, and in particular embodiments, to techniques and mechanisms for an LED current overshoot reduction apparatus.

BACKGROUND

A light emitting diode (LED) is a semiconductor light source. When a voltage is applied to the LED, a current flows through the LED. In response to the current flowing through the LED, electrons and holes recombine in the PN Junction of the diode. In the recombination process, energy is released in the form of photons.

In a typical LED system, a power switch is connected in series with an LED between a power source and ground. A Pulse Width Modulation (PWM) controller is employed to control the power switch. In operation, the PWM controller is configured to generate a gate drive signal applied to a gate of the power switch. The gate drive signal is controlled such that an average current flowing through the LED is adjustable based on different operating requirements. This PWM technique for controlling the LED average current is widely used for controlling LED brightness.

Power PWM dimming is a technique used to control the brightness of an LED by varying the amount of time the LED is powered on and off. Instead of adjusting the voltage or current supplied to the LED, PWM dimming rapidly switches the LED on and off at a high frequency. The brightness is determined by the ratio of the on-time to the off-time within each cycle, known as the duty cycle.

In operation, when power PWM dimming is applied to an LED, the average power delivered to the LED over time controls the brightness. A higher duty cycle means the LED is on for a longer portion of each cycle, resulting in higher brightness. Conversely, a lower duty cycle means the LED is on for a shorter portion, resulting in dimmer light. Power PWM dimming is widely used in applications requiring precise and efficient control of LED brightness, such as in automotive lighting.

Accuracy and linearity are critical design specifications in power PWM dimming. Achieving desired dimming accuracy and linearity requires considering or minimizing the delay time between the PWM signal and the LED current response, particularly in high frequency PWM control. High frequency operation can cause LED current overshoot (inrush current) during PWM transitions, leading to dimming inaccuracies, nonlinearity, and undesired LED light flickers. Although LED flickers are generally not harmful to the eyes of most people, they can cause discomfort, eye strain, headaches, and visual disturbances in some individuals. It would be desirable to have a simple apparatus through which the LED current overshoot can be reduced. This disclosure describes a simple and cost-efficient apparatus for reducing the LED current overshoot, thereby developing high-quality LED lighting products without LED light flickers.

SUMMARY

Technical advantages are generally achieved, by embodiments of this disclosure which describe an LED current overshoot reduction apparatus.

In accordance with an embodiment, an apparatus comprises a reference current generation circuit coupled between a first voltage bus and a second voltage bus, wherein the reference current generation circuit is configured to generate a predetermined reference current, a first reference current path comprising a first switch, wherein the predetermined reference current is configured to be mirrored to generate a first reference current in the first reference current path, a load current path comprising a power switch, and a pulse width modulation (PWM) deglitch circuit configured to control the first switch so as to reduce an overshoot occurring at a leading-edge of a load current flowing through the power switch.

In accordance with another embodiment, a method comprises generating a predetermined reference current using a reference current generation circuit coupled between a first voltage bus and a second voltage bus, mirroring the predetermined reference current to generate a first reference current in a first reference current path comprising a first switch, and controlling, by a PWM deglitch circuit, the first switch to reduce an overshoot occurring at a leading-edge of a load current flowing through a power switch.

In accordance with yet another embodiment, a system comprises a PWM switch, an integrated circuit and a light-emitting diode connected in series between a power source and ground, and a system controller configured to control the PWM switch, wherein the integrated circuit comprises a low-dropout regulator having an input configured to receive an input voltage and an output configured to generate a bias voltage on a first voltage bus, an undervoltage lockout circuit configured to receive the bias voltage and generate a control signal applied to a gate of a power switch, wherein a current flowing through the power switch is approximately equal to a current flowing through the light-emitting diode, a bandgap reference circuit configured to receive the bias voltage and generate a bandgap reference, a reference current generation circuit coupled between the first voltage bus and a second voltage bus, wherein the reference current generation circuit is configured to generate a predetermined reference current, a first reference current path comprising a first switch, wherein the predetermined reference current is configured to be mirrored to generate a first reference current in the first reference current path, and a PWM deglitch circuit configured to control the first switch so as to reduce an overshoot occurring at a leading-edge of a load current flowing through the power switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create alternative embodiments not explicitly described, and features suitable for such combinations are understood to be within the scope of this disclosure. It is therefore intended that the appended claims encompass any such modifications or embodiments.

The present disclosure will be described with respect to embodiments in a specific context, namely an LED current overshoot reduction apparatus. The disclosure may also be applied, however, to a variety of LED systems. Hereinafter, various embodiments will be explained in detail with reference to the accompanying drawings.

Figure 1:
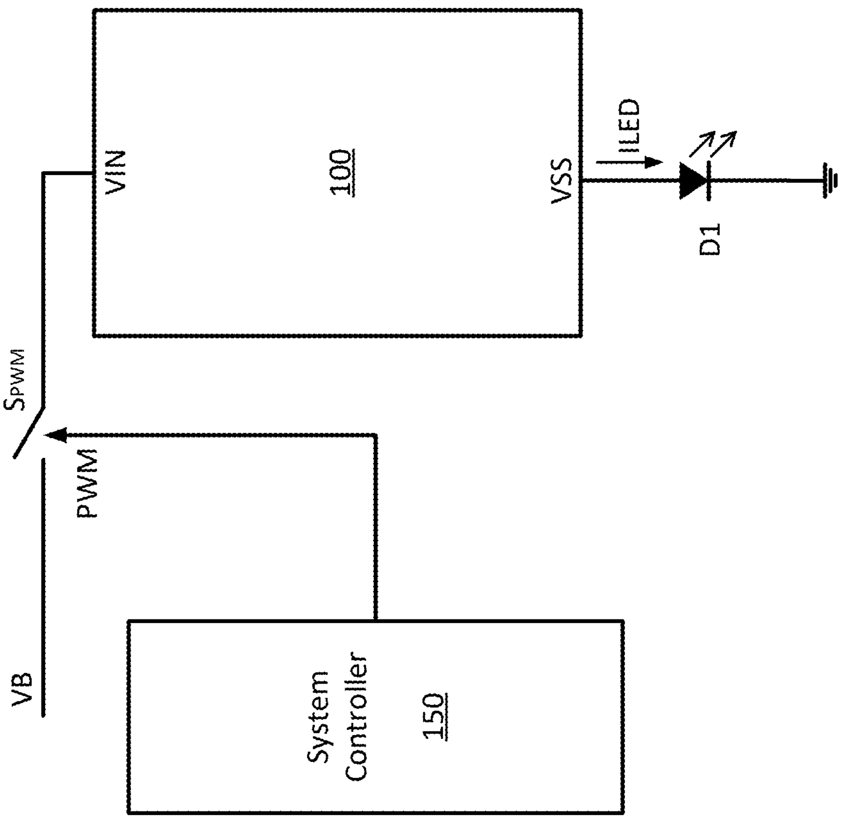
FIG. 1 illustrates a block diagram of a light emitting diode system in accordance with various embodiments of the present disclosure.

FIG. 1 illustrates a block diagram of a light emitting diode system in accordance with various embodiments of the present disclosure. As shown in FIG. 1, a PWM switch $S_{PWM}$, an integrated circuit 100 and a light emitting diode D1 are connected in series between a power source VB and ground. A system controller 150 is configured to generate a PWM signal (PWM) for controlling the PWM switch $S_{PWM}$.

It should be noted that the block diagram shown in FIG. 1 is merely an example. Depending on different applications and design needs, the system configuration may vary accordingly. For example, the light emitting diode D1 may be placed between the PWM switch $S_{PWM}$ and the integrated circuit 100. Furthermore, the PWM switch $S_{PWM}$ may be connected to ground directly. Under this system configuration, the PWM switch $S_{PWM}$ can be implemented as an n-type switch. The n-type switch typically has a lower on-resistance compared to a p-type switch for the same size, leading to lower voltage drops and higher efficiency in the light emitting diode system.

As shown in FIG. 1, a common node of the PWM switch $S_{PWM}$ and the integrated circuit 100 is labeled as VIN. A common node of the integrated circuit 100 and the light-emitting diode D1 is labeled as VSS. The current flowing through the light-emitting diode D1 is labeled as ILED. Throughout the description, ILED may be alternatively referred to as the LED current.

In some embodiments, the system controller 150 controls the PWM switch $S_{PWM}$ according to the power PWM dimming technique. In operation, the brightness of the light emitting diode D1 can be controlled by varying the amount of time the light emitting diode D1 is powered on and off. The brightness of the light emitting diode D1 is determined by the ratio of the on-time to the off-time within each cycle. When the light emitting diode D1 is powered on, the power source VB supplies power to the integrated circuit 100 through the turned-on PWM switch $S_{PWM}$. When the light emitting diode D1 is powered off, no power is supplied to the integrated circuit 100. Under power PWM dimming, the light emitting diode D1, along with the integrated circuit 100, is rapidly switched on and off at a high frequency. To ensure accurate and linear dimming, the delay time (e.g., soft start) from the PWM signal to the LED current response must be minimized. In a high frequency power PWM dimming process, soft start cannot be employed to lessen the fast PWM transition. The high frequency power PWM dimming process often leads to LED current overshoot. The present disclosure introduces four different implementations to reduce the LED current overshoot. These four different implementations to mitigate this LED current overshoot, which will be described in detail with respect to FIGS. 2, 5, 6 and 8.

In some embodiments, the system controller 150 is implemented as a microcontroller. In alternative embodiments, the system controller 150 may be implemented as any suitable processors such as digital signal processing (DSP) controllers, field-programmable gate array (FPGA) processors and the like.

The PWM switch $S_{PWM}$ shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices, any combinations thereof and the like.

The integrated circuit 100 functions as an LED driver. Throughout the description, the integrated circuit 100 may be alternatively referred to as an LED driver 100. In some embodiments, the LED driver 100 comprises a bias power supply, an undervoltage protection circuit, a reference circuit, a reference current generation circuit, a PWM deglitch circuit, a plurality of reference current paths, a precisely controlled current mirror, a power switch, a gate protection circuit and a startup circuit.

In some embodiments, the bias power supply is implemented as a low-dropout regulator. An input of the low-dropout regulator is configured to receive the voltage on VIN, and generate a bias voltage. The undervoltage protection circuit is implemented as an undervoltage lockout circuit. The undervoltage lockout circuit is configured to receive the bias voltage. Once the bias voltage is greater than a predetermined threshold, the undervoltage lockout circuit is configured to generate a control signal applied to the gate of the power switch in the LED driver 100. A current flowing through the power switch is approximately equal to a current flowing through the light emitting diode D1. The reference circuit is implemented as a bandgap reference circuit. The bandgap reference circuit is configured to receive the bias voltage and generate a bandgap reference.

The reference current generation circuit is coupled between the bias voltage and VSS. The reference current generation circuit is configured to generate a predetermined reference current.

In a first implementation of the LED driver 100, the LED driver 100 comprises a first reference current path. The first reference current path comprises a first switch. The predetermined reference current is mirrored to generate a first reference current in the first reference current path. Furthermore, the first reference current is mirrored to generate a load current flowing through the power switch in the LED driver 100. The PWM deglitch circuit is configured to control the first switch so as to reduce an overshoot occurring at a leading-edge of the load current flowing through the power switch. The detailed structure and operating principle of the first implementation of the LED driver 100 will be described below with respect to FIG. 2.

In a second implementation of the LED driver 100, the LED driver 100 comprises a first reference current path and a second reference current path. The second reference current path is connected in parallel with the first reference current path. The first reference current path comprises a first switch. The predetermined reference current is mirrored to generate a first reference current in the first reference current path and a second reference current in the second reference current path. Furthermore, a sum of the first reference current and the second reference current is mirrored to generate a load current flowing through the power switch in the LED driver 100. The PWM deglitch circuit is configured to control the first switch so as to reduce an overshoot occurring at a leading-edge of a load current flowing through the power switch. The detailed structure and operating principle of the second implementation of the LED driver 100 will be described below with respect to FIG. 5.

In a third implementation of the LED driver 100, the LED driver 100 comprises a first reference current path, a second reference current path, a third reference current path and a fourth reference current path. The second reference current path is connected in parallel with the first reference current path. The first reference current path comprises a first switch. The third reference current path comprises a second switch. The third reference current path is connected in parallel with the first reference current path. The fourth reference current path comprises a third switch. The fourth reference current path is connected in parallel with the first reference current path. The predetermined reference current is mirrored to generate a first reference current in the first reference current path, a second reference current in the second reference current path, a third reference current in the third reference current path and a fourth reference current in the fourth reference current path. Furthermore, a sum of the first reference current, the second reference current, the third reference current and the fourth reference current is mirrored to generate a load current flowing through the power switch. The PWM deglitch circuit is configured to control the first switch, the second switch and the third switch so as to reduce an overshoot occurring at a leading-edge of the load current flowing through the power switch. The detailed structure and operating principle of the third implementation of the LED driver 100 will be described below with respect to FIGS. 6-7.

In a fourth implementation of the LED driver 100, the LED driver 100 comprises a first reference current path, a second reference current path, a third reference current path, a fourth reference current path and a reference current subtraction circuit. The second reference current path is connected in parallel with the first reference current path. The first reference current path comprises a first switch. The third reference current path comprises a second switch. The third reference current path is connected in parallel with the first reference current path. The fourth reference current path comprises a third switch. The fourth reference current path is connected in parallel with the first reference current path. The predetermined reference current is mirrored to generate a first reference current in the first reference current path, a second reference current in the second reference current path, a third reference current in the third reference current path and a fourth reference current in the fourth reference current path. Furthermore, a sum of the first reference current, the second reference current, the third reference current and the fourth reference current is mirrored to generate a load current flowing through the power switch. The PWM deglitch circuit is configured to control the first switch, the second switch and the third switch so as to reduce an overshoot occurring at a leading-edge of the load current flowing through the power switch. Moreover, the reference current subtraction circuit is configured to subtract a current component from the sum of the reference currents. The reduced sum of the reference currents can further reduce the overshoot. The detailed structure and operating principle of the fourth implementation of the LED driver 100 will be described below with respect to FIG. 8.

It should be noted that the light emitting diode system shown in FIG. 1 is merely an example. Depending on different applications and design needs, the system configuration may vary accordingly. For example, a current sense resistor may be placed between the light emitting diode and ground. Furthermore, while FIG. 1 illustrates one light emitting diode, the light emitting diode system could accommodate any number of light emitting diodes connected in series and/or parallel.

Figure 2:
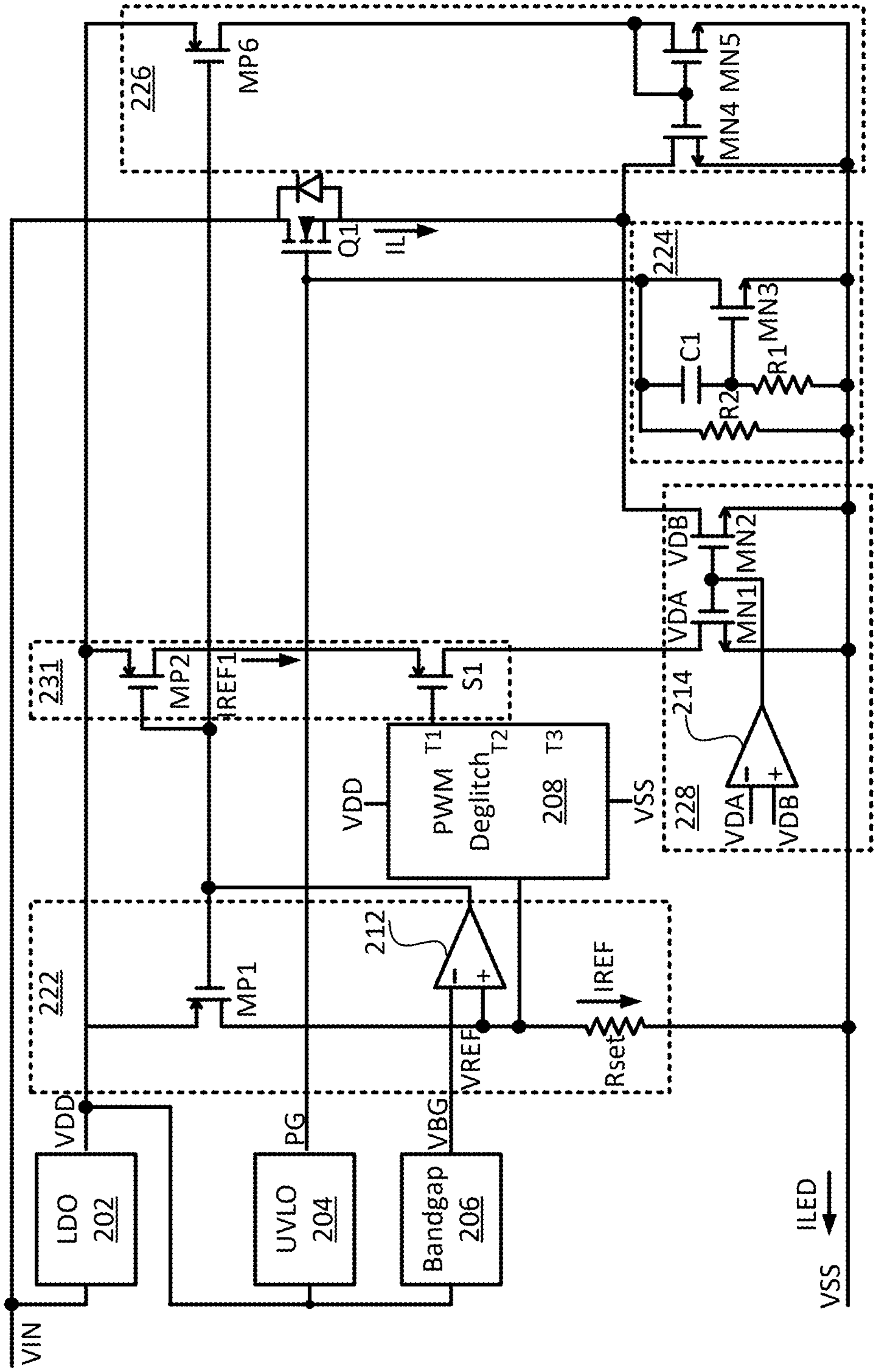
FIG. 2 illustrates a schematic diagram of a first implementation of the LED driver shown in FIG. 1 in accordance with various embodiments of the present disclosure.

FIG. 2 illustrates a schematic diagram of a first implementation of the LED driver shown in FIG. 1 in accordance with various embodiments of the present disclosure. The LED driver comprises a low-dropout regulator 202, an undervoltage lockout circuit 204, a bandgap reference circuit 206, a PWM deglitch circuit 208, a reference current generation circuit 222, a first reference current path 231, a power switch Q1, a precisely controlled current mirror 228, a gate protection circuit 224 and a startup circuit 226.

As shown in FIG. 2, an input of the low-dropout regulator 202 is configured to receive an input voltage VIN. The low-dropout regulator 202 is configured to generate a bias voltage VDD. Throughout the description, the voltage bus on which the bias voltage VDD is generated may be alternatively referred to as a first voltage bus. The voltage bus labeled as VSS may be alternatively referred to as a second voltage bus.

The undervoltage lockout circuit 204 is configured to receive the bias voltage VDD. Once the bias voltage VDD is greater than a predetermined threshold, the undervoltage lockout circuit 204 is configured to generate a control signal applied to a gate of the power switch Q1. This control signal keeps the power switch Q1 on. In other words, the control signal functions as a power good (PG) signal.

The bandgap reference circuit 206 is configured to receive the bias voltage VDD and generate a bandgap reference VBG. The bandgap reference VBG is used to set up a reference current IREF as shown in FIG. 2.

The reference current generation circuit 222 comprises a first p-type transistor MP1, a resistor $R_{SET}$ and a first amplifier 212. The first p-type transistor MP1 and the resistor $R_{SET}$ are connected in series between the first voltage bus VDD and the second voltage bus VSS. An inverting input of the first amplifier 212 is configured to receive the bandgap reference VBG. A non-inverting input of the first amplifier 212 is connected to a common node of the first p-type transistor MP1 and the resistor $R_{SET}$. The voltage on the common node of the first p-type transistor MP1 and the resistor $R_{SET}$ is labeled as VREF as shown in FIG. 2. An output of the first amplifier 212 is connected to a gate of the first p-type transistor MP1.

In operation, the first amplifier 212 forces the voltage on the node VREF to be equal to the bandgap reference VBG. The current flowing through the resistor $R_{SET}$ is equal to the bandgap reference VBG divided by the resistance value of $R_{SET}$. This current is the reference current IREF of the LED driver. Throughout the description, the voltage on the node VREF may be alternatively referred to as a reference voltage signal.

The first reference current path 231 comprises a second p-type transistor MP2 and a first switch S1 connected in series between the first voltage bus VDD and a voltage node VDA. The gate of the first switch S1 is controlled by the PWM deglitch circuit 208.

In operation, the first p-type transistor MP1 and the second p-type transistor MP2 form a first current mirror. Through the first current mirror, the reference current IREF generated by the reference current generation circuit 222 is mirrored to generate a first reference current IREF1 in the first reference current path 231.

The precisely controlled current mirror 228 comprises a first n-type transistor MN1, a second n-type transistor MN2 and a second amplifier 214. As shown in FIG. 2, the first n-type transistor MN1 and the first reference current path 231 are connected in series between the second voltage bus VSS and the first voltage bus VIN. The second n-type transistor MN2 is connected in series with the power switch Q1. An inverting input of the second amplifier 214 is connected to a drain of the first n-type transistor MN1. The drain of the first n-type transistor MN1 is labeled as VDA as shown in FIG. 2. A non-inverting input of the second amplifier 214 is connected to a drain of the second n-type transistor MN2. The drain of the second n-type transistor MN2 is labeled as VDB as shown in FIG. 2. An output of the second amplifier 214 is connected to the gate of the first n-type transistor MN1 and the gate of the second n-type transistor MN2.

In operation, the second amplifier 214 forces the voltage on the drain of the first n-type transistor MN1 to be equal to the voltage on the drain of the second n-type transistor MN2. Such a voltage relationship helps to achieve a precisely controlled current mirror. Through the precisely controlled current mirror 228, the first reference current IREF1 in the first reference current path 231 is mirrored to generate the load current IL flowing through the power switch Q1. In some embodiments, the ratio of the current flowing through the second n-type transistor MN2 to the current flowing through the first n-type transistor MN1 is in a range from about 1000 to about 10,000. Throughout the description, the precisely controlled current mirror 228 may be alternatively referred to as a second current mirror.

The PWM deglitch circuit 208 is configured to receive the voltage on the voltage node VREF. This voltage is proportional to the reference current IREF. Based on the received voltage on VREF, the PWM deglitch circuit 208 is configured to generate a plurality of control signals for controlling switches in different reference current paths so as to reduce an overshoot occurring at a leading-edge of a load current flowing through the power switch Q1. In the first implementation of the LED driver shown in FIG. 2, the PWM deglitch circuit 208 generates a control signal at a first terminal T1. This control signal is applied to the gate of the first switch S1 to reduce the overshoot of the load current IL.

In operation, PWM switching often introduces transient noise to the functional blocks of the LED driver (e.g., low-dropout regulator 202 and/or and bandgap reference circuit 206). During switching or power-up, the transient noise can lead to the overshoot of the load current flowing through the power switch Q1. The PWM deglitch circuit 208 is able to detect the transient noise on the node VREF, and convert the transient noise into a digital signal to control the on and off of the first switch S1. More particularly, when the transient noise occurs at the node VREF, the PWM deglitch circuit 208 converts the transient noise into a logic high signal to turn off the first switch S1. Once the first switch S1 is temporarily turned off, the first reference current IREF1 is reduced, thereby reducing the overshoot of the load current IL flowing through the power switch Q1.

The load current path of the LED driver comprises the power switch Q1. The load current IL flows through the power switch Q1. The LED current ILED includes some bias currents (e.g., IREF). Since the bias currents of the LED driver are quite small, the load current IL is approximately equal to the LED current ILED.

The gate protection circuit 224 is connected between the gate of the power switch Q1 and the second voltage bus VSS. The gate protection circuit 224 comprises a first resistor R1, a second resistor R2, a capacitor C1 and a third n-type transistor MN3. The third n-type transistor MN3 is connected between the gate of the power switch Q1 and the second voltage bus VSS. The first resistor R1 and the capacitor C1 are connected in series between the gate of the power switch Q1 and the second voltage bus VSS. The second resistor R2 is connected between the gate of the power switch Q1 and the second voltage bus VSS.

In operation, the gate protection circuit 224 serves two functions. First, the capacitor C1, the first resistor R1 and the third n-type transistor MN3 form a voltage clamping circuit configured to provide various protections such as electrostatic discharge (ESD) and electrical overstress (EOS) protection. When there is a fast voltage event from the input voltage bus VIN, such as ESD or power switching, a high-voltage transient can travel from the drain terminal of the power switch Q1 to its gate through the parasitic Miller capacitance of the power switch Q1. This fast transient can turn on the third n-type transistor MN3, thereby keeping the gate voltage of Q1 at a safe level. Second, the second resistor R2 provides a passive pulldown for the power switch Q1, helping the undervoltage lockout circuit 204 keep the power switch Q1 off when the LED drive operates in an undervoltage condition.

The startup circuit 226 comprises a third current mirror comprising a fourth n-type transistor MN4 and a fifth n-type transistor MN5. The startup circuit 226 further comprises a sixth p-type transistor MP6. As shown in FIG. 2, the sixth p-type transistor MP6 and the fifth n-type transistor MN5 are connected in series between the first voltage bus VDD and the second voltage bus VSS. The power switch Q1 and the fourth n-type transistor MN4 are connected in series between the input voltage bus VIN and the second voltage bus VSS. The gate of the sixth p-type transistor MP6 is connected to the gate of the first p-type transistor MP1. The reference current IREF is mirrored to generate a current flowing through the sixth p-type transistor MP6.

In operation, the precisely controlled current mirror 228 has multiple stable states. The startup circuit 226 ensures that an initial current flows, prompting the precisely controlled current mirror 228 to enter its correct operating state.

Figure 3:
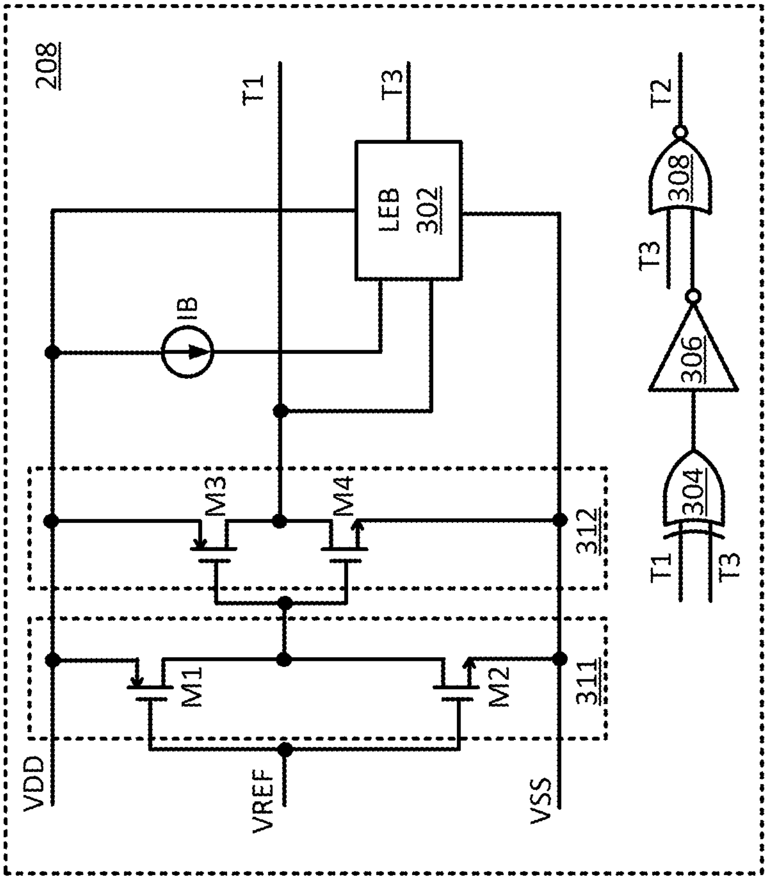
FIG. 3 illustrates a schematic diagram of the PWM deglitch circuit shown in FIG. 2 in accordance with various embodiments of the present disclosure.

FIG. 3 illustrates a schematic diagram of the PWM deglitch circuit shown in FIG. 2 in accordance with various embodiments of the present disclosure. The PWM deglitch circuit 208 comprises a first inverter 311, a second inverter 312, a current source IB, a leading-edge blanking circuit 302, an XOR gate 304, an inverter 306 and an NOR gate 308. The first inverter 311 is formed by a p-type transistor M1 and an n-type transistor M2 connected in series between VDD and VSS. The second inverter 312 is formed by a p-type transistor M3 and an n-type transistor M4 connected in series between VDD and VSS.

As shown in FIG. 3, the first inverter 311 is configured to receive the reference voltage signal VREF. The reference voltage signal VREF is proportional to the reference current IREF. In some embodiments, the threshold voltage of the first inverter 311 is selected such that the first inverter 311 switches its output from a logic high state to a logic low state when VREF exceeds its target or steady state value. In other words, the steady state value of VREF may be selected as the threshold voltage of the first inverter 311. Once VREF is greater than this threshold voltage, the first inverter generates a logic low signal fed into the second inverter 312.

As shown in FIG. 3, the second inverter 312 has an input connected to the output of the first inverter 311. The output of the second inverter 312 is configured to generate a first control signal applied to a first terminal T1. Referring back to FIG. 2, T1 is connected to the gate of the first switch S1. When an overshoot occurs, the leading-edge portion of VREF exceeds the steady state value of VREF. In response to this, the first inverter 311 generates a logic low signal. The second inverter 312 converts this logic low signal into a logic high signal applied to the gate of the first switch S1. Since the first switch S1 is a p-type transistor, the logic high signal turns off the first switch S1. Referring back to FIG. 2, once the first switch S1 is turned off, the current flowing through the power switch Q1 is reduced. The reduced load current helps reduce the overshoot of the LED current ILED.

The leading-edge blanking circuit 302 may comprise a timer, an inverter and an AND gate. The current source IB provides a bias current for the timer. The timer is configured to generate a blanking pulse in response to the leading-edge of VREF. The blanking pulse is fed into the inverter. A first input of the AND gate is configured to receive the first control signal (T1). A second input of the AND gate is configured to receive the output signal of the inverter. In this way, the AND gate only allows the first control signal to pass through and reach the third terminal T3 after the blanking period is over. The signal generated at the third terminal T3 is a third control signal. The third control signal will be described in detail below with respect to FIG. 6.

The XOR gate 304, the inverter 306 and the NOR gate 308 are connected in cascade as shown in FIG. 3. A first input of the XOR gate 304 is configured to receive the first control signal (T1). A second input of the XOR gate 304 is configured to receive the third control signal (T3). An input of the inverter 306 is connected to an output of the XOR gate 304. A first input of the NOR gate 308 is configured to receive the third control signal (T3). A second input of the NOR gate 308 is connected to an output of the inverter 306. An output of the NOR gate 308 is configured to generate a control signal at the second terminal T2. The signal generated at the second terminal T2 is a second control signal. The second control signal will be described in detail below with respect to FIG. 6.

In response to an overshoot of VREF, the PWM deglitch circuit 208 is able to generate three control signals. The duration of the logic high state of the first control signal (T1) is approximately equal to the duration of the overshoot of VREF. The first control signal is simultaneously divided into two portions. The leading portion is the second control signal (T2). The trailing portion is the third control signal (T3). These three control signals function as three control variables to turn off corresponding reference current paths, thereby reducing the overshoot of the load current IL flowing through the power switch Q1.

Figure 4:
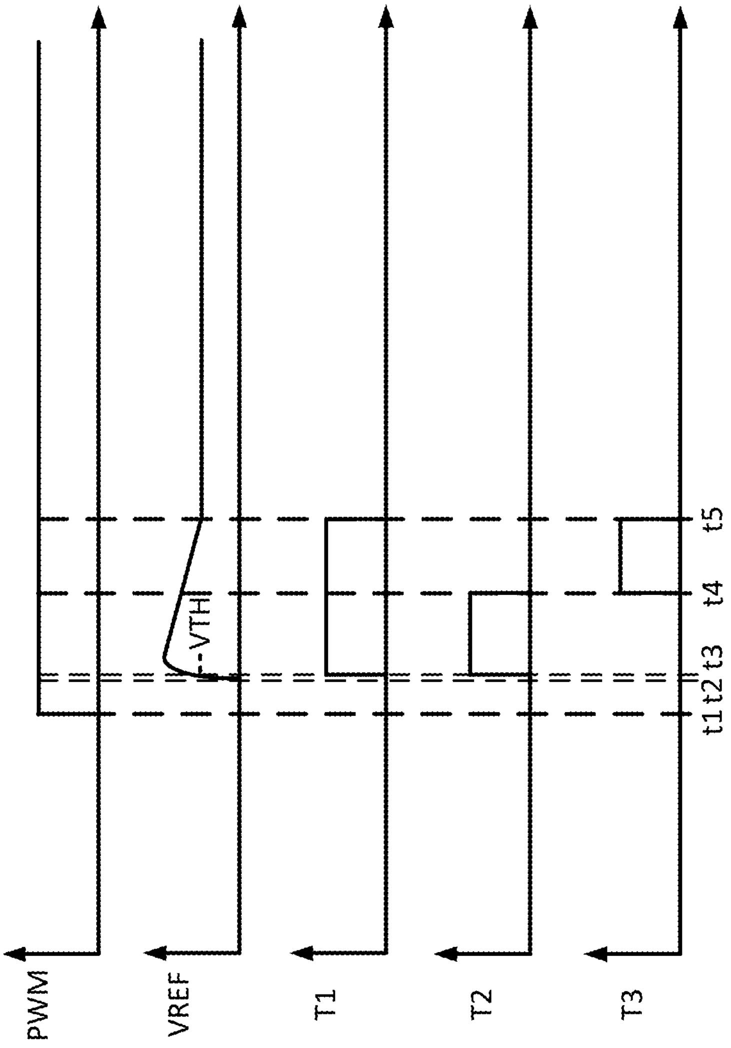
FIG. 4 illustrates various signals associated with the PWM deglitch circuit shown in FIG. 3 in accordance with various embodiments of the present disclosure.

FIG. 4 illustrates various signals associated with the PWM deglitch circuit shown in FIG. 3 in accordance with various embodiments of the present disclosure. The horizontal axis represents intervals of time. There are five rows. The first row represents the PWM signal shown in FIG. 1. The second row represents the reference voltage signal VREF. The third row represents the first control signal T1. The fourth row represents the second control signal T2. The fifth row represents the third control signal T3.

At t1, the PWM signal changes from a logic low state to a logic high state. In response to this change, the PWM switch is turned on and power is supplied to the LED driver. After a suitable circuit delay, the reference voltage signal VREF starts to establish from t2. As shown in FIG. 4, an overshoot of VREF occurs. At t3, the overshoot exceeds the threshold voltage VTH of the first inverter 311. The first inverter 311 and the second inverter 312 collectively function as a buffer. From t3 to t5, the overshoot is greater than threshold voltage VTH. As a result, the first control signal (T1) is of a logic high state from t3 to t5. Referring back to FIG. 3, through the XOR gate 304, the inverter 306 and the NOR gate 308, the leading portion (from t3 to t4) of the first control signal (T1) is generated as the second control signal (T2). Through the leading-edge blanking circuit 302, the trailing portion (from t4 to t5) of the first control signal (T1) is generated as the third control signal (T3).

Figure 5:
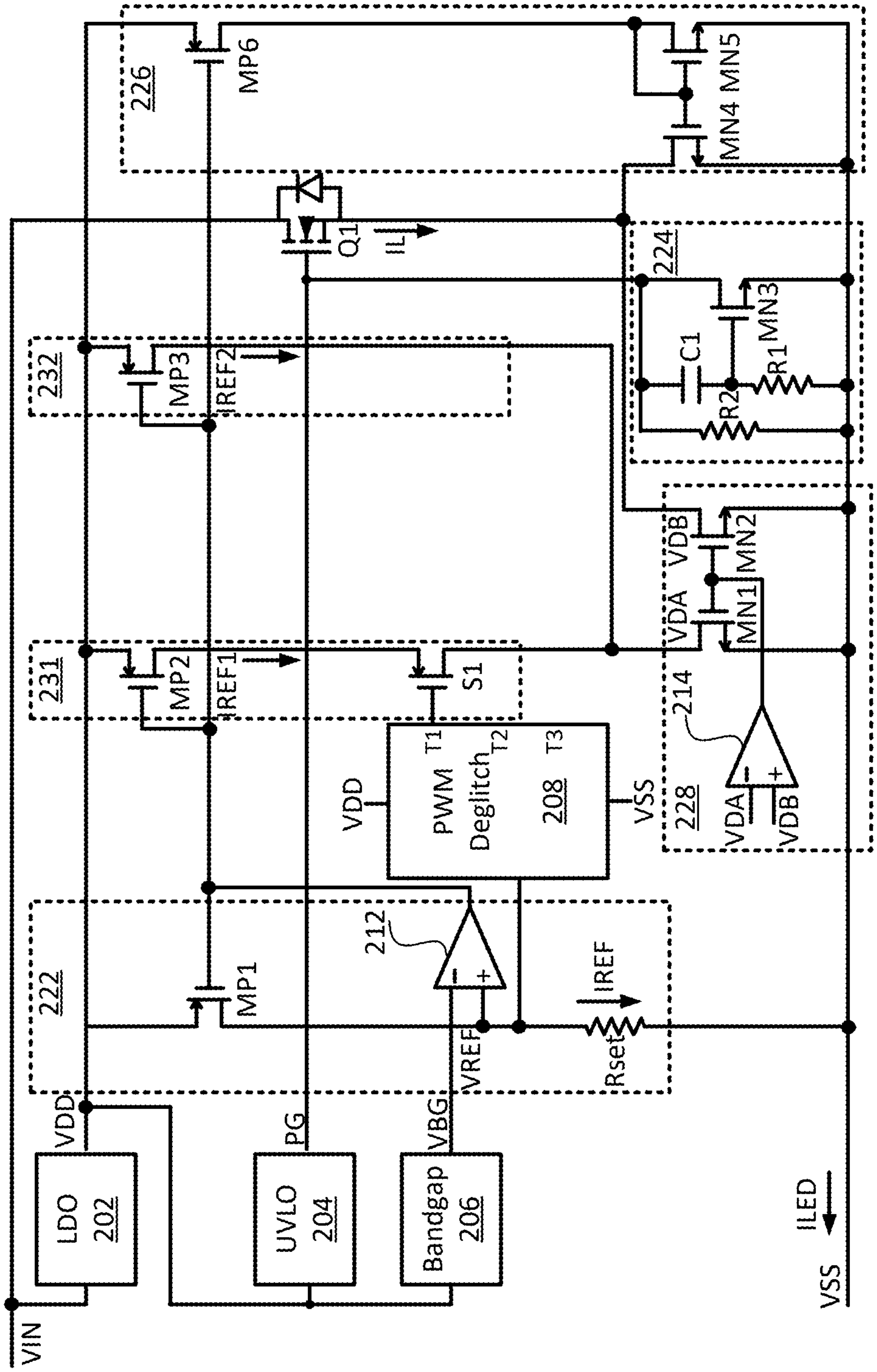
FIG. 5 illustrates a schematic diagram of a second implementation of the LED driver shown in FIG. 1 in accordance with various embodiments of the present disclosure.

FIG. 5 illustrates a schematic diagram of a second implementation of the LED driver shown in FIG. 1 in accordance with various embodiments of the present disclosure. The second implementation of the LED driver is similar to the first implementation of the LED driver shown in FIG. 2 except that a second reference current path 232 is added. As shown in FIG. 5, the second reference current path 232 is connected in parallel with the first reference current path 231. The second reference current path 232 comprises a third p-type transistor MP3. The reference current IREF is mirrored to generate a second reference current IREF2 in the second reference current path 232. A sum of the first reference current IREF1 and the second reference current IREF2 is mirrored to generate the load current IL flowing through the power switch Q1.

The second reference current path 232 does not comprise a switch controlled by the PWM deglitch circuit 208. In operation, the second reference current IREF2 in the second reference current path 232 is unchanged. The PWM deglitch circuit 208 can only partially cancel the overshoot through turning off the first switch S1 in the first reference current path 231.

Figure 6:
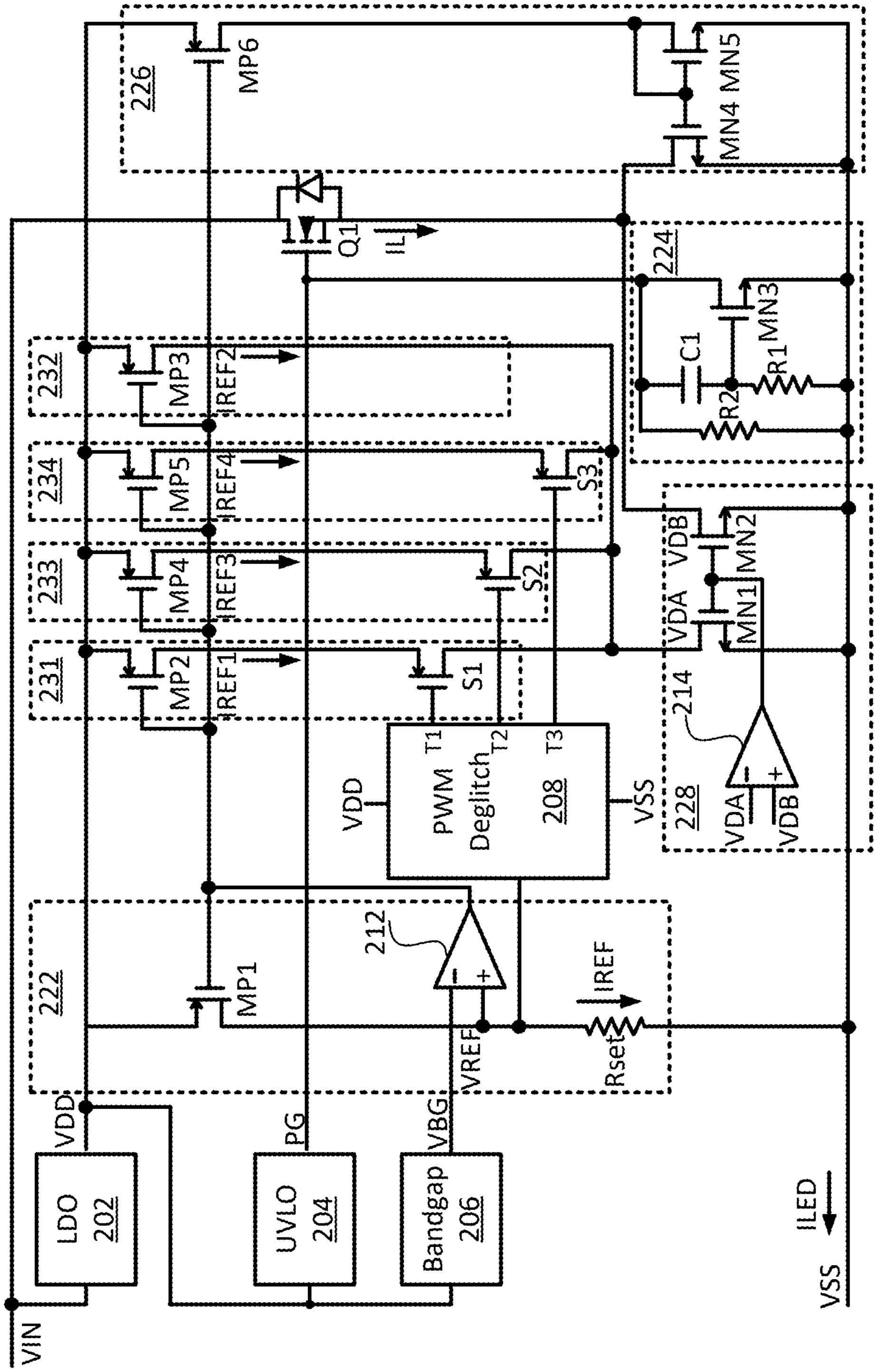
FIG. 6 illustrates a schematic diagram of a third implementation of the LED driver shown in FIG. 1 in accordance with various embodiments of the present disclosure.

FIG. 6 illustrates a schematic diagram of a third implementation of the LED driver shown in FIG. 1 in accordance with various embodiments of the present disclosure. The third implementation of the LED driver is similar to the second implementation of the LED driver shown in FIG. 5 except that a third reference current path 233 and a fourth reference current path 234 are added to further improve the performance of the LED driver.

As shown in FIG. 6, the third reference current path 233 is connected in parallel with the first reference current path 231. The third reference current path 233 comprises a fourth p-type transistor MP4 and a second switch S2 connected in series. The second switch S2 is implemented as a p-type transistor. The second switch S2 is controlled by the PWM deglitch circuit 208.

The fourth reference current path 234 is connected in parallel with the first reference current path 231. The fourth reference current path 234 comprises a fifth p-type transistor MP5 and a third switch S3 connected in series. The third switch S3 is implemented as a p-type transistor. The third switch S3 is controlled by the PWM deglitch circuit 208.

In operation, the reference current IREF is mirrored to generate a first reference current IREF1 in the first reference current path 231. The reference current IREF is mirrored to generate a second reference current IREF2 in the second reference current path 232. The reference current IREF is mirrored to generate a third reference current IREF3 in the third reference current path 233. The reference current IREF is mirrored to generate a fourth reference current IREF4 in the fourth reference current path 234. A sum of the first reference current IREF1, the second reference current IREF2, the third reference current IREF3 and the fourth reference current IREF4 is mirrored to generate the load current IL flowing through the power switch Q1. In response to the overshoot of the reference voltage signal VREF, the PWM deglitch circuit 208 is configured to turn off the control switches S1, S2 and S3 so as to reduce the sum of the reference currents, thereby reducing the overshoot of the load current IL flowing through the power switch Q1.

Figure 7:
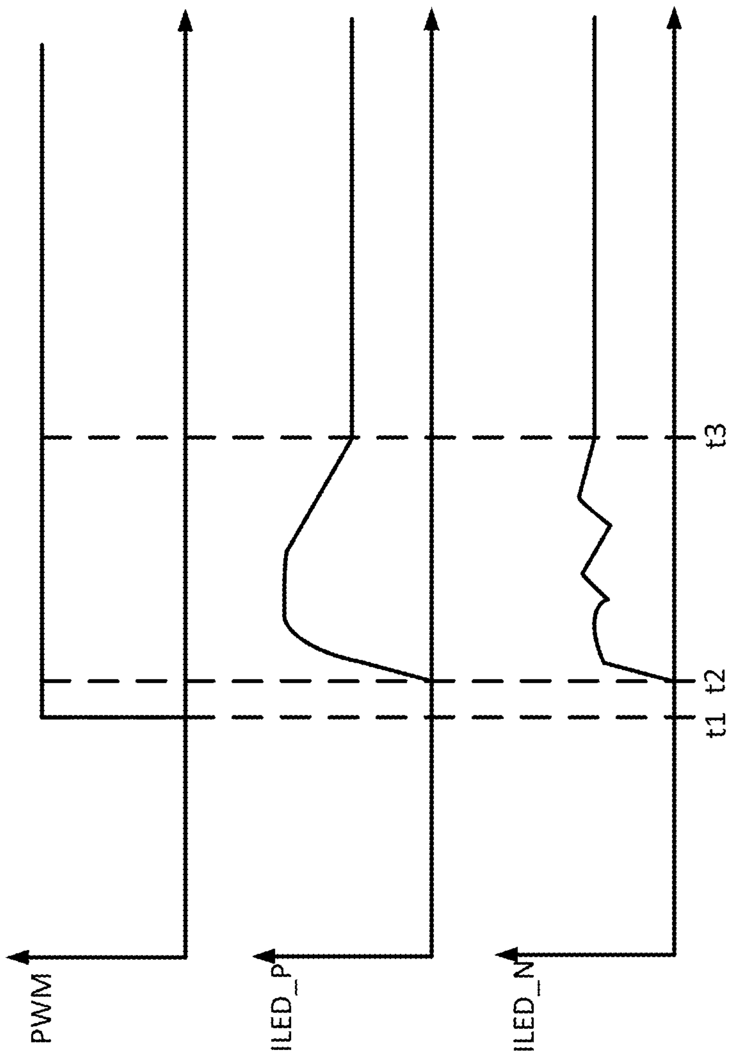
FIG. 7 illustrates various signals associated with the LED driver shown in FIG. 6 in accordance with various embodiments of the present disclosure.

FIG. 7 illustrates various signals associated with the LED driver shown in FIG. 6 in accordance with various embodiments of the present disclosure. The horizontal axis represents intervals of time. There are three rows. The first row represents the PWM signal. The second row represents the LED current (LED_P) when a conventional LED driver is employed to drive a light emitting diode. The third row represents the LED current (LED_N) when the LED driver shown in FIG. 6 is employed to drive the light emitting diode.

At t1, the PWM signal changes from a logic low state to a logic high state. In response to this change, the PWM switch is turned on and power is supplied to the LED driver. After a suitable circuit delay, the LED current starts to establish at t2. When a conventional LED driver is employed to drive a light emitting diode, there is an overshoot from t2 to t3. As shown in FIG. 7, the LED current rapidly increases to a peak, remains constant for a period, and then begins to linearly decrease to its steady-state value. In contrast, when the LED driver shown in FIG. 6 is employed to drive the light emitting diode, the LED current increases in a linear manner to an intermediate value, and then curves downward to a first valley. From the first valley, the LED current increases to a first peak, and then linearly decreases to a second valley. From the second valley, the LED current increases to a second peak, and then begins to linearly decrease to its steady-state value. The peak (e.g., the second peak) in the third row is much lower than the peak in the second row.

Figure 8:
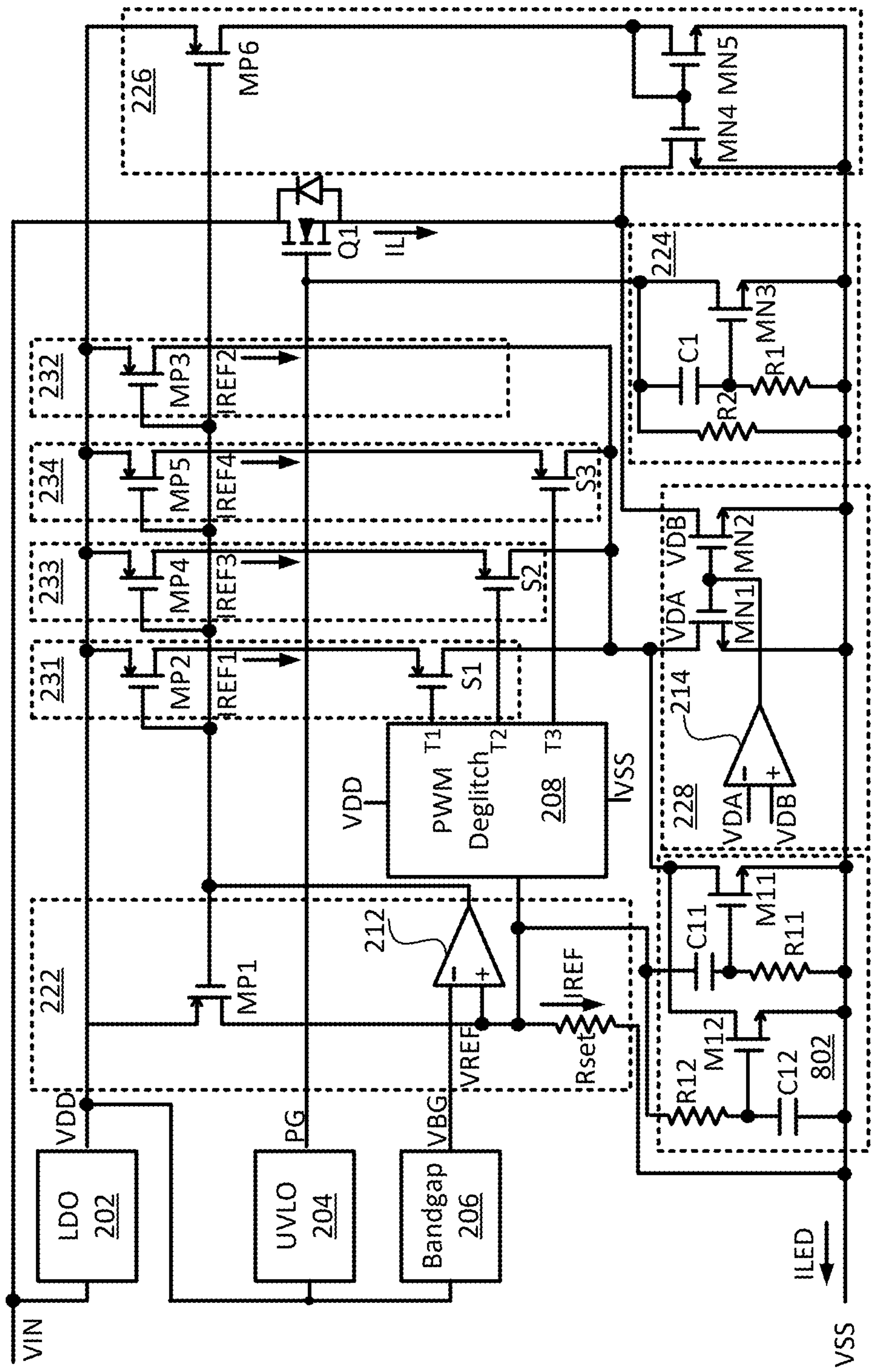
FIG. 8 illustrates a schematic diagram of a fourth implementation of the LED driver shown in FIG. 1 in accordance with various embodiments of the present disclosure.

FIG. 8 illustrates a schematic diagram of a fourth implementation of the LED driver shown in FIG. 1 in accordance with various embodiments of the present disclosure. The fourth implementation of the LED driver is similar to the third implementation of the LED driver shown in FIG. 6 except that a reference current subtraction circuit 802 is added to further improve the performance of the LED driver.

The reference current subtraction circuit 802 comprises a first current subtraction transistor M11, a rise detection capacitor C11, a rise detection resistor R11, a second current subtraction transistor M12, a fall detection resistor R12 and a fall detection capacitor C12.

As shown in FIG. 8, the first current subtraction transistor M11 is connected between the drain of the first n-type transistor MN1 and the second voltage bus VSS. The rise detection capacitor C11 and the rise detection resistor R11 are connected in series between the common node of the first p-type transistor MP1 and the resistor $R_{SET}$, and the second voltage bus VSS. A common node of the rise detection capacitor C11 and the rise detection resistor R11 is connected to the gate of the first current subtraction transistor M11.

The second current subtraction transistor M12 is connected between the drain of the first n-type transistor MN1 and the second voltage bus VSS. The fall detection resistor R12 and the fall detection capacitor C12 are connected in series between the common node of the first p-type transistor MP1 and the resistor $R_{SET}$, and the second voltage bus VSS. The common node of the fall detection resistor R12 and the fall detection capacitor C12 is connected to the gate of the second current subtraction transistor M12.

In operation, the reference current subtraction circuit 802 is configured to subtract a current component from the sum of the reference currents, thereby reducing the overshoot occurring at the leading-edge of the load current IL. The rise detection capacitor C11 and the rise detection resistor R11 set the delay timing for the rising section of the overshoot signal, while the fall detection resistor R12 and the fall detection capacitor C12 set the delay timing for the falling section of the overshoot signal. To further improve the subtraction amplitude, simply adjust the channel widths of the first current subtraction transistor M11 and the second current subtraction transistor M12.

Figure 9:
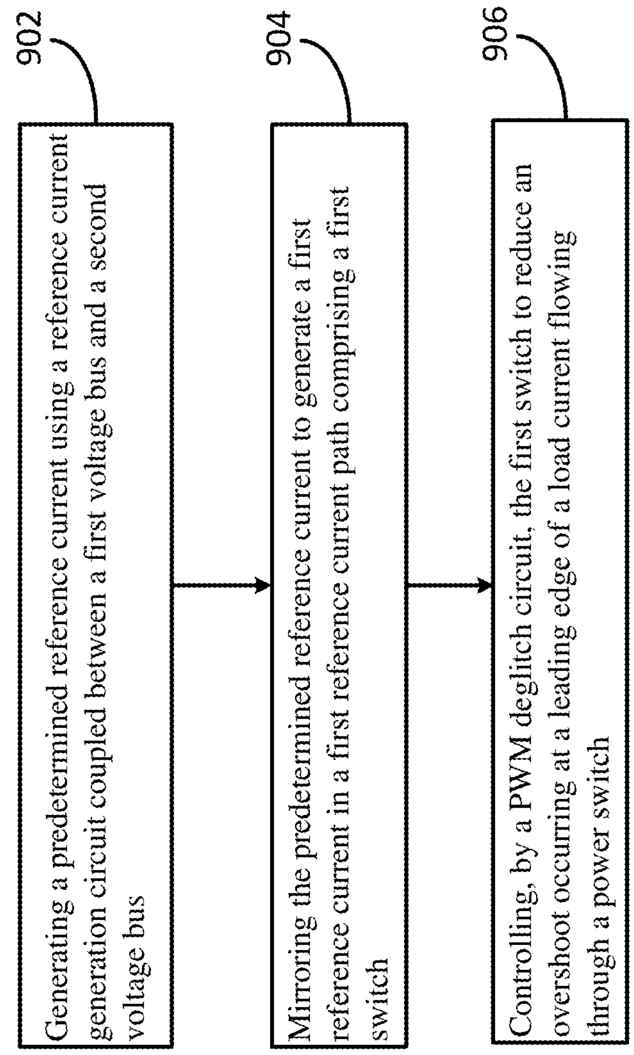
FIG. 9 illustrates a flow chart of a method for controlling the LED driver shown in FIG. 1 in accordance with various embodiments of the present disclosure.

FIG. 9 illustrates a flow chart of a method for controlling the LED driver shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, a predetermined reference current is generated using a reference current generation circuit coupled between a first voltage bus and a second voltage bus.

At step 904, the predetermined reference current is mirrored to generate a first reference current in a first reference current path comprising a first switch.

At step 906, the first switch is controlled by a PWM deglitch circuit to reduce an overshoot occurring at a leading-edge of a load current flowing through a power switch.

The method further comprises mirroring the predetermined reference current to generate a second reference current in a second reference current path, and mirroring a sum of the first reference current and the second reference current to generate the load current flowing through the power switch, wherein the second reference current path is connected in parallel with the first reference current path.

The method further comprises mirroring the predetermined reference current to generate a second reference current in a second reference current path, mirroring the predetermined reference current to generate a third reference current in a third reference current path, mirroring the predetermined reference current to generate a fourth reference current in a fourth reference current path, and mirroring a sum of the first reference current, the second reference current, the third reference current and the fourth reference current to generate the load current flowing through the power switch, and wherein the second reference current path is connected in parallel with the first reference current path, the third reference current path is connected in parallel with the first reference current path, and wherein the third reference current path comprises a second switch controlled by the PWM deglitch circuit, and the fourth reference current path is connected in parallel with the first reference current path, wherein the fourth reference current path comprises a third switch controlled by the PWM deglitch circuit.

The reference current generation circuit comprises a first p-type transistor and a resistor connected in series between the first voltage bus and the second voltage bus, and a first amplifier having an inverting input configured to receive a bandgap reference, a non-inverting input connected to a common node of the first p-type transistor and the resistor and an output connected to a gate of the first p-type transistor and a gate of a second p-type transistor, the first reference current path comprises the second p-type transistor and the first switch connected in series, and wherein the first p-type transistor and the second p-type transistor form a first current mirror through which the predetermined reference current is mirrored to generate the first reference current in the first reference current path, and a second current mirror comprises a first n-type transistor connected in series with the first reference current path, a second n-type transistor connected in series with the power switch, wherein the first n-type transistor and the second n-type transistor form a second current mirror through which the sum of the first reference current, the second reference current, the third reference current and the fourth reference current is mirrored to generate the load current flowing through the power switch, and a second amplifier having an inverting input connected to a drain of the first n-type transistor, a non-inverting input connected to a drain of the second n-type transistor and an output connected to a gate of the first n-type transistor and a gate of the second n-type transistor.

The PWM deglitch circuit comprises a first inverter configured to receive a reference voltage signal proportional to the predetermined reference current, a second inverter having an input connected to an output of the first inverter and an output configured to generate a first control signal applied to a gate of the first switch, a leading-edge blanking circuit having an input configured to receive the first control signal and an output configured to generate a third control signal applied to a gate of the third switch, and an XOR gate, an inverter and an NOR gate connected in cascade, wherein a first input of the XOR gate is configured to receive the first control signal, a second input of the XOR gate is configured to receive the third control signal, an input of the inverter is connected to an output of the XOR gate, a first input of the NOR gate is configured to receive the third control signal, a second input of the NOR gate is connected to an output of the inverter, and an output of the NOR gate is configured to generate a second control signal applied to a gate of the second switch.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, which may perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed is:

1. An apparatus comprising:

a reference current generation circuit coupled between a first voltage bus and a second voltage bus, wherein the reference current generation circuit is configured to generate a predetermined reference current;

a first reference current path comprising a first switch, wherein the predetermined reference current is configured to be mirrored to generate a first reference current in the first reference current path;

a load current path comprising a power switch; and a pulse width modulation (PWM) deglitch circuit configured to control the first switch so as to reduce an overshoot occurring at a leading-edge of a load current flowing through the power switch.

2. The apparatus of claim 1, wherein:

the first reference current is mirrored to generate the load current flowing through the power switch.

3. The apparatus of claim 1, further comprising:

a second reference current path connected in parallel with the first reference current path, wherein:

the second reference current path comprises a third p-type transistor;

the predetermined reference current is configured to be mirrored to generate a second reference current in the second reference current path; and a sum of the first reference current and the second reference current is mirrored to generate the load current flowing through the power switch.

4. The apparatus of claim 1, further comprising:

a second reference current path connected in parallel with the first reference current path;

a third reference current path connected in parallel with the first reference current path, wherein the third reference current path comprises a fourth p-type transistor and a second switch connected in series, and wherein the second switch is controlled by the PWM deglitch circuit; and a fourth reference current path connected in parallel with the first reference current path, wherein the fourth reference current path comprises a fifth p-type transistor and a third switch connected in series, and wherein the third switch is controlled by the PWM deglitch circuit, wherein:

the predetermined reference current is configured to be mirrored to generate a second reference current in the second reference current path;

the predetermined reference current is configured to be mirrored to generate a third reference current in the third reference current path;

the predetermined reference current is configured to be mirrored to generate a fourth reference current in the fourth reference current path; and a sum of the first reference current, the second reference current, the third reference current and the fourth reference current is mirrored to generate the load current flowing through the power switch.

5. The apparatus of claim 4, wherein the PWM deglitch circuit comprises:

a first inverter configured to receive a reference voltage signal proportional to the predetermined reference current;

a second inverter having an input connected to an output of the first inverter and an output configured to generate a first control signal applied to a gate of the first switch;

a leading-edge blanking circuit having an input configured to receive the first control signal, and an output configured to generate a third control signal applied to a gate of the third switch; and an XOR gate, an inverter and an NOR gate connected in cascade, wherein:

a first input of the XOR gate is configured to receive the first control signal;

a second input of the XOR gate is configured to receive the third control signal;

an input of the inverter is connected to an output of the XOR gate;

a first input of the NOR gate is configured to receive the third control signal;

a second input of the NOR gate is connected to an output of the inverter; and an output of the NOR gate is configured to generate a second control signal applied to a gate of the second switch.

6. The apparatus of claim 1, wherein:

the reference current generation circuit comprises:

a first p-type transistor and a resistor connected in series between the first voltage bus and the second voltage bus; and a first amplifier having an inverting input configured to receive a bandgap reference, a non-inverting input connected to a common node of the first p-type transistor and the resistor, and an output connected to a gate of the first p-type transistor and a gate of a second p-type transistor; and the first reference current path comprises the second p-type transistor and the first switch connected in series, and wherein the first p-type transistor and the second p-type transistor form a first current mirror through which the predetermined reference current is mirrored to generate the first reference current in the first reference current path.

7. The apparatus of claim 6, further comprising:

a first n-type transistor connected in series with the first reference current path;

a second n-type transistor connected in series with the power switch, wherein the first n-type transistor and the second n-type transistor form a second current mirror through which the first reference current is mirrored to generate the load current flowing through the power switch; and a second amplifier having an inverting input connected to a drain of the first n-type transistor, a non-inverting input connected to a drain of the second n-type transistor, and an output connected to a gate of the first n-type transistor and a gate of the second n-type transistor.

8. The apparatus of claim 7, further comprising:

a reference current subtraction circuit configured to reduce the first reference current so as to reduce the overshoot occurring at the leading-edge of the load current, wherein the reference current subtraction circuit comprises:

a first current subtraction transistor connected between the drain of the first n-type transistor and the second voltage bus;

a rise detection capacitor and a rise detection resistor connected in series between the common node of the first p-type transistor and the resistor, and the second voltage bus, and wherein a common node of the rise detection capacitor and the rise detection resistor is connected to a gate of the first current subtraction transistor;

a second current subtraction transistor connected between the drain of the first n-type transistor and the second voltage bus; and a fall detection resistor and a fall detection capacitor connected in series between the common node of the first p-type transistor and the resistor, and the second voltage bus, and wherein a common node of the fall detection resistor and the fall detection capacitor is connected to a gate of the second current subtraction transistor.

9. The apparatus of claim 1, further comprising:

a low-dropout regulator having an input configured to receive an input voltage and an output configured to generate a bias voltage;

an undervoltage lockout circuit configured to receive the bias voltage and generate a control signal applied to a gate of the power switch; and a bandgap reference circuit configured to receive a bias voltage from a bias power supply and generate a bandgap reference.

10. The apparatus of claim 1, further comprising:

a gate protection circuit connected between a gate of the power switch and the second voltage bus, wherein the gate protection circuit comprises a first resistor, a second resistor, a capacitor and a third n-type transistor, and wherein:

the third n-type transistor is connected between the gate of the power switch and the second voltage bus;

the capacitor and the first resistor are connected in series between the gate of the power switch and the second voltage bus; and the second resistor is connected between the gate of the power switch and the second voltage bus.

11. The apparatus of claim 1, further comprising:

a startup circuit comprising a third current mirror comprising a fourth n-type transistor and a fifth n-type transistor and a sixth p-type transistor, and wherein:

the sixth p-type transistor and the fifth n-type transistor are connected in series between the first voltage bus and the second voltage bus;

the power switch and the fourth n-type transistor are connected in series; and the predetermined reference current is configured to be mirrored to generate a current flowing through the sixth p-type transistor.

12. A method comprising:

generating a predetermined reference current using a reference current generation circuit coupled between a first voltage bus and a second voltage bus;

mirroring the predetermined reference current to generate a first reference current in a first reference current path comprising a first switch; and controlling, by a PWM deglitch circuit, the first switch to reduce an overshoot occurring at a leading-edge of a load current flowing through a power switch.

13. The method of claim 12, further comprising:

mirroring the predetermined reference current to generate a second reference current in a second reference current path; and mirroring a sum of the first reference current and the second reference current to generate the load current flowing through the power switch, wherein the second reference current path is connected in parallel with the first reference current path.

14. The method of claim 12, further comprising:

mirroring the predetermined reference current to generate a second reference current in a second reference current path;

mirroring the predetermined reference current to generate a third reference current in a third reference current path;

mirroring the predetermined reference current to generate a fourth reference current in a fourth reference current path; and mirroring a sum of the first reference current, the second reference current, the third reference current and the fourth reference current to generate the load current flowing through the power switch, and wherein:

the second reference current path is connected in parallel with the first reference current path;

the third reference current path is connected in parallel with the first reference current path, and wherein the third reference current path comprises a second switch controlled by the PWM deglitch circuit; and the fourth reference current path is connected in parallel with the first reference current path, wherein the fourth reference current path comprises a third switch controlled by the PWM deglitch circuit.

15. The method of claim 14, wherein:

the reference current generation circuit comprises:

a first p-type transistor and a resistor connected in series between the first voltage bus and the second voltage bus; and a first amplifier having an inverting input configured to receive a bandgap reference, a non-inverting input connected to a common node of the first p-type transistor and the resistor and an output connected to a gate of the first p-type transistor and a gate of a second p-type transistor;

the first reference current path comprises the second p-type transistor and the first switch connected in series, and wherein the first p-type transistor and the second p-type transistor form a first current mirror through which the predetermined reference current is mirrored to generate the first reference current in the first reference current path; and a second current mirror comprises:

a first n-type transistor connected in series with the first reference current path;

a second n-type transistor is connected in series with the power switch, wherein the first n-type transistor and the second n-type transistor form a second current mirror through which the sum of the first reference current, the second reference current, the third reference current and the fourth reference current is mirrored to generate the load current flowing through the power switch; and a second amplifier has an inverting input connected to a drain of the first n-type transistor, a non-inverting input connected to a drain of the second n-type transistor and an output connected to a gate of the first n-type transistor and a gate of the second n-type transistor.

16. The method of claim 14, wherein the PWM deglitch circuit comprises:

a first inverter configured to receive a reference voltage signal proportional to the predetermined reference current;

a second inverter having an input connected to an output of the first inverter and an output configured to generate a first control signal applied to a gate of the first switch;

a leading-edge blanking circuit having an input configured to receive the first control signal and an output configured to generate a third control signal applied to a gate of the third switch; and an XOR gate, an inverter and an NOR gate connected in cascade, wherein:

a first input of the XOR gate is configured to receive the first control signal;

a second input of the XOR gate is configured to receive the third control signal;

an input of the inverter is connected to an output of the XOR gate;

a first input of the NOR gate is configured to receive the third control signal;

a second input of the NOR gate is connected to an output of the inverter; and an output of the NOR gate is configured to generate a second control signal applied to a gate of the second switch.

17. A system comprising:

a PWM switch, an integrated circuit and a light-emitting diode connected in series between a power source and ground; and a system controller configured to control the PWM switch, wherein the integrated circuit comprises:

a low-dropout regulator having an input configured to receive an input voltage and an output configured to generate a bias voltage on a first voltage bus;

an undervoltage lockout circuit configured to receive the bias voltage and generate a control signal applied to a gate of a power switch, wherein a current flowing through the power switch is approximately equal to a current flowing through the light-emitting diode;

a bandgap reference circuit configured to receive the bias voltage and generate a bandgap reference;

a reference current generation circuit coupled between the first voltage bus and a second voltage bus, wherein the reference current generation circuit is configured to generate a predetermined reference current;

a first reference current path comprising a first switch, wherein the predetermined reference current is configured to be mirrored to generate a first reference current in the first reference current path; and a PWM deglitch circuit configured to control the first switch so as to reduce an overshoot occurring at a leading-edge of a load current flowing through the power switch.

18. The system of claim 17, wherein:

the reference current generation circuit comprises:

a first p-type transistor and a resistor connected in series between the first voltage bus and the second voltage bus; and a first amplifier having an inverting input configured to receive a bandgap reference, a non-inverting input connected to a common node of the first p-type transistor and the resistor, and an output connected to a gate of the first p-type transistor and a gate of a second p-type transistor; and the first reference current path comprises the second p-type transistor and the first switch connected in series, and wherein the first p-type transistor and the second p-type transistor form a first current mirror through which the predetermined reference current is mirrored to generate the first reference current in the first reference current path.

19. The system of claim 18, further comprising:

a second reference current path connected in parallel with the first reference current path;

a third reference current path connected in parallel with the first reference current path, wherein the third reference current path comprises a fourth p-type transistor and a second switch connected in series, and wherein the second switch is controlled by the PWM deglitch circuit;

a fourth reference current path connected in parallel with the first reference current path, wherein the fourth reference current path comprises a fifth p-type transistor and a third switch connected in series, and wherein the third switch is controlled by the PWM deglitch circuit, wherein:

the predetermined reference current is configured to be mirrored to generate a second reference current in the second reference current path;

the predetermined reference current is configured to be mirrored to generate a third reference current in the third reference current path;

the predetermined reference current is configured to be mirrored to generate a fourth reference current in the fourth reference current path; and a sum of the first reference current, the second reference current, the third reference current and the fourth reference current is mirrored to generate the load current flowing through the power switch;

a first n-type transistor connected in series with the first reference current path;

a second n-type transistor connected in series with the power switch, wherein the first n-type transistor and the second n-type transistor form a second current mirror through which the first reference current is mirrored to generate the load current flowing through the power switch; and a second amplifier having an inverting input connected to a drain of the first n-type transistor, a non-inverting input connected to a drain of the second n-type transistor and an output connected to a gate of the first n-type transistor and a gate of the second n-type transistor.

20. The system of claim 17, further comprising:

a gate protection circuit connected between a gate of the power switch and the second voltage bus, wherein the second voltage bus is a common node of the integrated circuit and the light-emitting diode, and wherein the gate protection circuit comprises a first resistor, a second resistor, a capacitor and a third n-type transistor, and wherein:

the third n-type transistor is connected between the gate of the power switch and the second voltage bus;

the capacitor and the first resistor are connected in series between the gate of the power switch and the second voltage bus; and the second resistor is connected between the gate of the power switch and the second voltage bus; and a startup circuit comprising a third current mirror comprising a fourth n-type transistor and a fifth n-type transistor and a sixth p-type transistor, and wherein:

the sixth p-type transistor and the fifth n-type transistor are connected in series between the first voltage bus and the second voltage bus;

the power switch and the fourth n-type transistor are connected in series; and the predetermined reference current is configured to be mirrored to generate a current flowing through the sixth p-type transistor.

* * * * *